United States Patent
Sato et al.

(10) Patent No.: US 10,044,963 B2
(45) Date of Patent: Aug. 7, 2018

(54) IMAGING APPARATUS

(71) Applicant: Panasonic Intellectual Property Management Co., Ltd., Osaka (JP)

(72) Inventors: Genki Sato, Osaka (JP); Katsuji Kunisue, Osaka (JP); Hisako Chiaki, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 50 days.

(21) Appl. No.: 15/429,323

(22) Filed: Feb. 10, 2017

(65) Prior Publication Data

US 2017/0289482 A1    Oct. 5, 2017

(30) Foreign Application Priority Data

Mar. 30, 2016   (JP) ................... 2016-067203
Jan. 13, 2017   (JP) ................... 2017-003806

(51) Int. Cl.
*H04N 5/376*   (2011.01)
*H04N 5/225*   (2006.01)
*H04N 5/232*   (2006.01)
*H04N 5/262*   (2006.01)
*H04N 5/073*   (2006.01)

(52) U.S. Cl.
CPC ......... *H04N 5/3765* (2013.01); *H04N 5/0733* (2013.01); *H04N 5/2258* (2013.01); *H04N 5/23232* (2013.01); *H04N 5/2628* (2013.01); *H04N 5/23203* (2013.01)

(58) Field of Classification Search
None
See application file for complete search history.

(56) References Cited

U.S. PATENT DOCUMENTS

| | | | |
|---|---|---|---|
| 2009/0201361 A1* | 8/2009 | Lyon | H04N 5/23203 348/36 |
| 2010/0157105 A1 | 6/2010 | Yokohata | |
| 2015/0271483 A1* | 9/2015 | Sun | H04N 17/002 348/187 |

FOREIGN PATENT DOCUMENTS

| | | | |
|---|---|---|---|
| JP | 2010-147925 | 7/2010 | |
| JP | 2013-120435 | 6/2013 | |
| WO | WO 2012089895 A1 * | 7/2012 | ........... H04N 5/2258 |

* cited by examiner

*Primary Examiner* — Roberto Velez
*Assistant Examiner* — Quan Pham
(74) *Attorney, Agent, or Firm* — Renner Otto Boisselle & Sklar, LLP

(57) ABSTRACT

An imaging apparatus includes a rolling shutter type first image sensor and second image sensor, a timing generator that controls operation timings of these two image sensors, and a controller that subjects generated image data to image processing and controls the timing generator. The first image sensor captures an image of a subject to generate first image data, and the second image sensor captures an image of the subject to generate second image data. Each of the first image data and the second image data has a duplicate region in which the subject is partly duplicated. The controller controls the timing generator in such a way that a period over which the first image sensor exposes lines within the duplicate region in the first image data coincides with a period over which the second image sensor exposes lines within the duplicate region in the second image data.

4 Claims, 8 Drawing Sheets

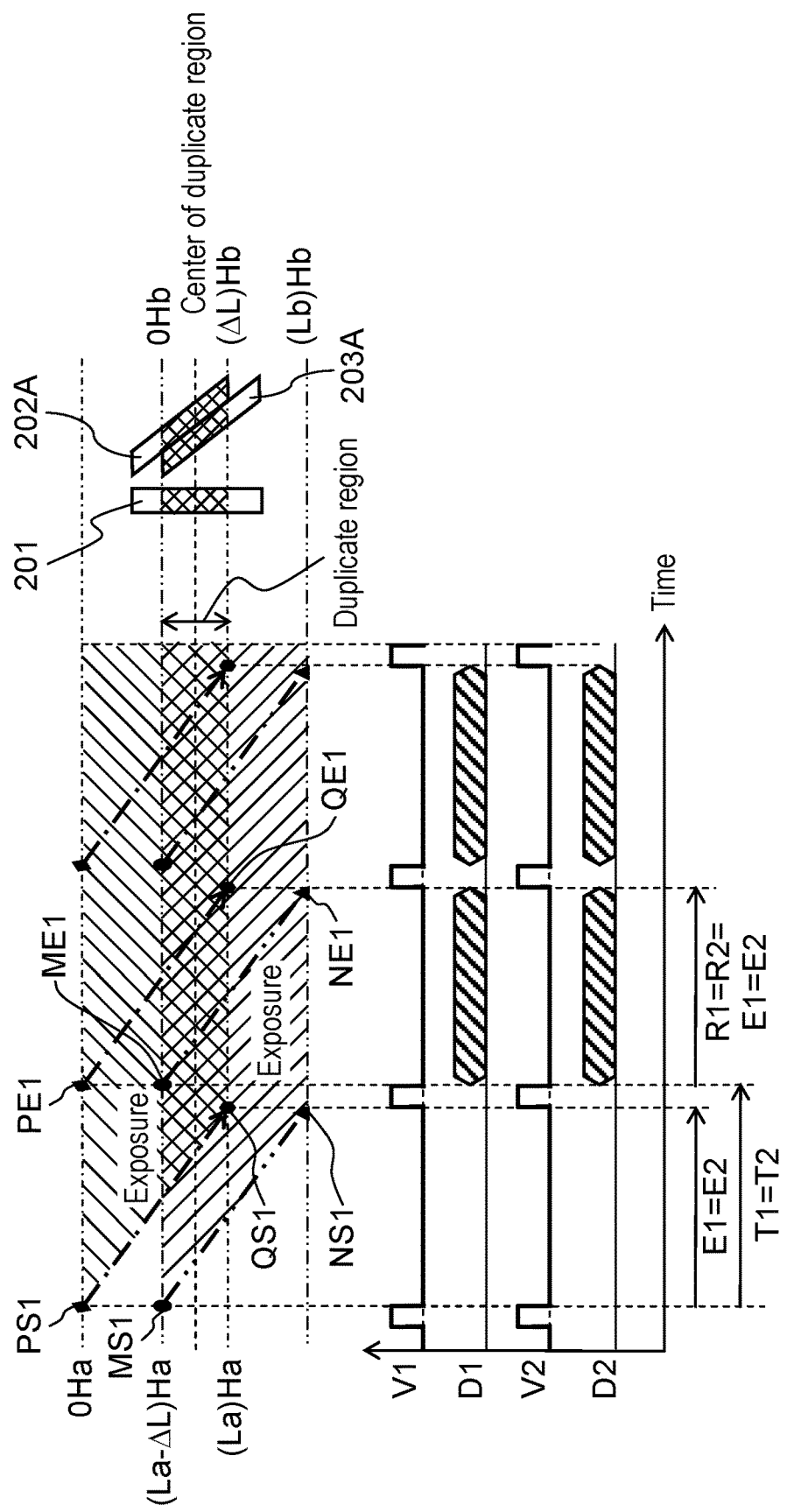

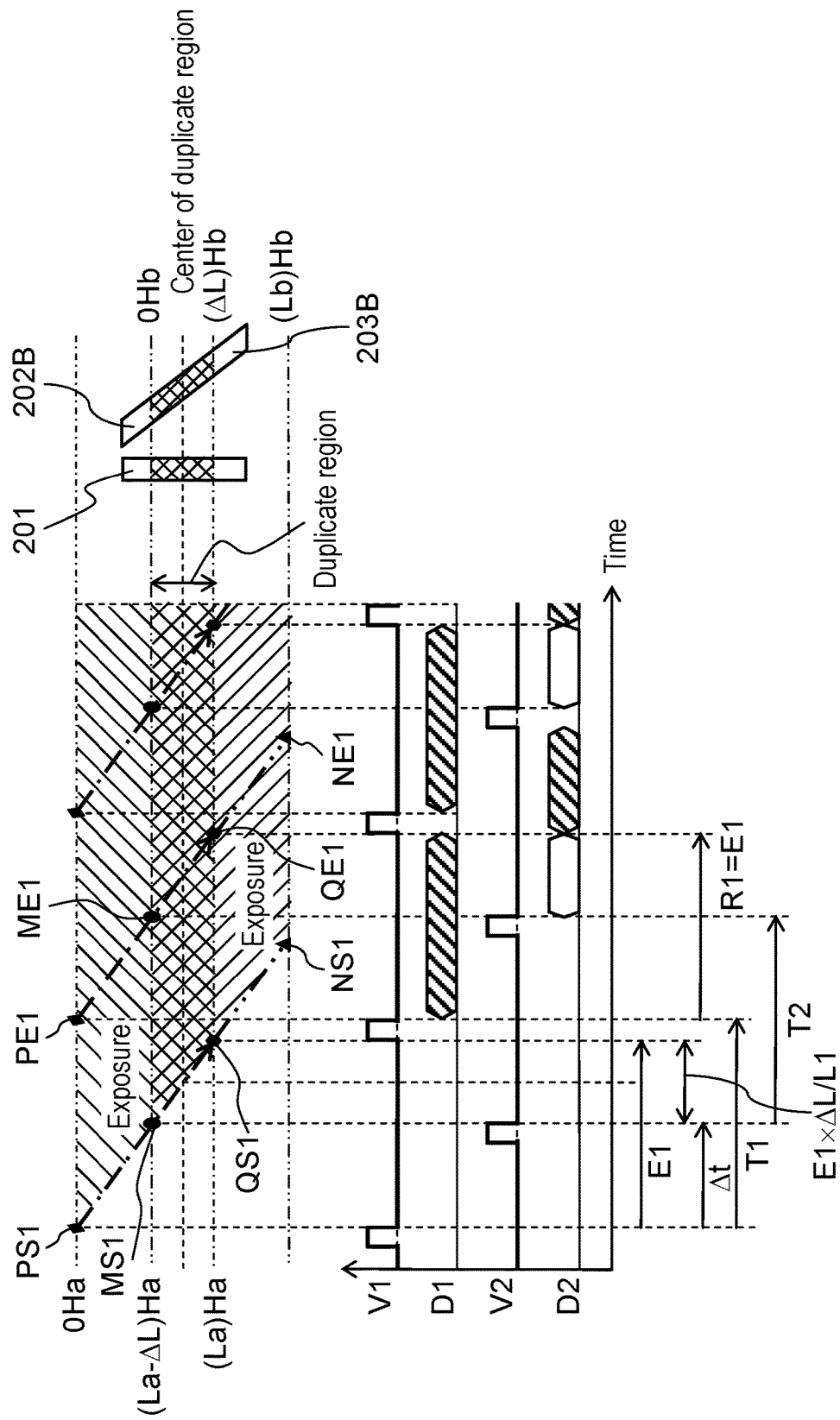

IMAGING APPARATUS

BACKGROUND

1. Technical Field

The present disclosure relates to an imaging apparatus including two rolling shutter type image sensors.

2. Description of the Related Art

Unexamined Japanese Patent Publication No. 2010-147925 discloses an imaging apparatus that cuts out an intended area from a wide-angle video and provides a photographer with a video having a desired composition.

Unexamined Japanese Patent Publication No. 2013-120435 discloses a multi-view imaging apparatus that corrects rolling shutter distortions, which tend to occur in complementary metal oxide semiconductor (CMOS) image sensors.

SUMMARY

The present disclosure provides an imaging apparatus that uses a rolling shutter type first image sensor and second image sensor to capture images in which a subject is partly duplicated, with a minimal time shift between boundary regions of the images.

An imaging apparatus of the present disclosure includes a first image sensor, a second image sensor, a timing generator, and a controller. Both of the first image sensor and the second image sensor are of a rolling shutter type. The first image sensor captures an image of a subject to generate first image data. The second image sensor captures an image of the subject to generate second image data. Each of the first image data and the second image data has a duplicate region in which the subject is partly duplicated. The timing generator controls operation timings of the first image sensor and the second image sensor. The controller subjects generated image data to image processing. The controller controls the timing generator in such a way that a period over which the first image sensor exposes lines within the duplicate region in the first image data coincides with a period over which the second image sensor exposes lines within the duplicate region in the second image data.

An imaging apparatus of the present disclosure is effective in using a rolling shutter type first image sensor and second image sensor to capture images in which a subject is partly duplicated, with a minimal time shift between boundary regions of the images.

BRIEF DESCRIPTION OF THE DRAWINGS

FIG. 4A is a timing chart of signals related to operations of the first image sensor and the second image sensor, which may cause rolling shutter distortions;

FIG. 4B is a timing chart, in the first exemplary embodiment, of signals related to operations of the first image sensor and the second image sensor;

DETAILED DESCRIPTION

Some exemplary embodiments will be described below in detail with appropriate reference to the accompanying drawings. In some cases, excessive details will not be described. For example, details of a matter already known in the art will not be described, and components substantially the same as those already described will not be described again. The reason is to prevent the following description from being needlessly redundant, facilitating an understanding of those skilled in the art.

The inventor provides the accompanying drawings and the following description for the purpose of helping those skilled in the art sufficiently understand the present disclosure, and therefore the accompanying drawings and the following description are not intended to limit a subject matter described in the claims.

First Exemplary Embodiment

A first exemplary embodiment will be described below with reference to FIG. 1 to FIG. 4B.

[1-1. Configuration]

Figure 1:
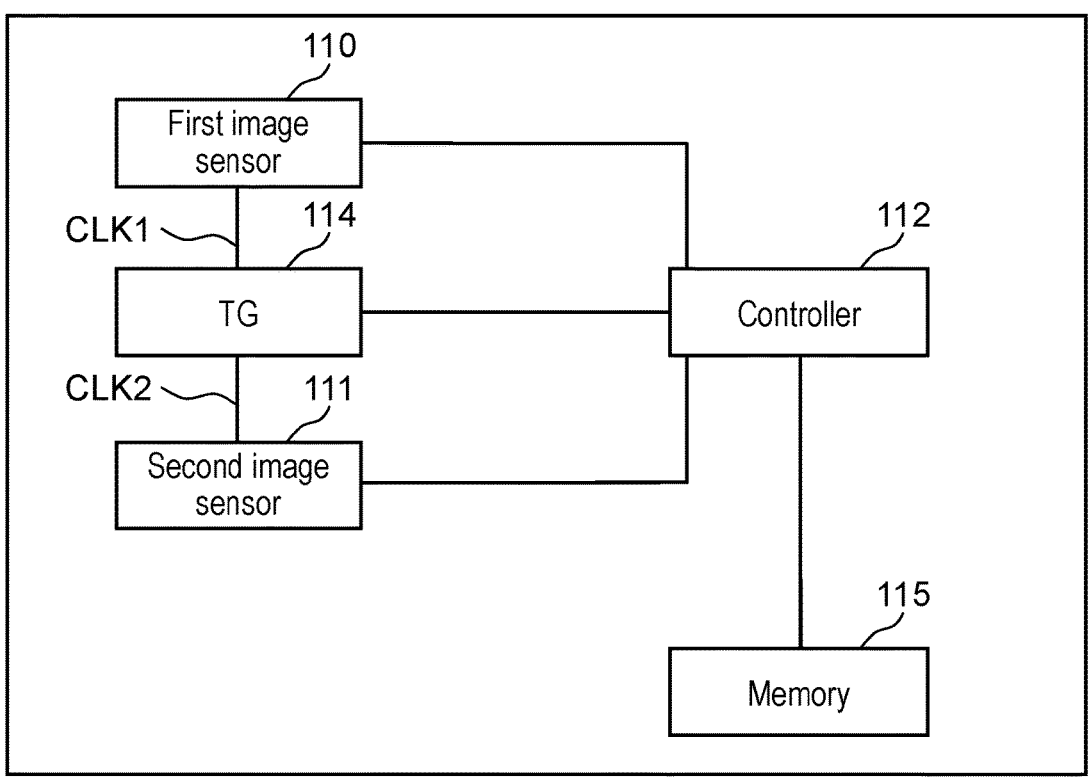
FIG. 1 is a block diagram illustrating an imaging apparatus in a first exemplary embodiment of the present disclosure.

FIG. 1 is a block diagram illustrating imaging apparatus 100 in the first exemplary embodiment. Imaging apparatus 100 includes first image sensor 110, second image sensor 111, timing generator (TG) 114, controller 112, and memory 115.

Each of first image sensor 110 and second image sensor 111, which may typically be a complementary metal oxide semiconductor (CMOS) sensor, captures an image of a subject to generate image data. For example, the generated image data may have 3840 pixels in a horizontal direction and 2160 pixels in a vertical direction, namely, have a 4K resolution and may contain frame images to be captured at a frame rate of 60 frames per second (fps). The image of the subject is created by an optical system (not illustrated) in each of first image sensor 110 and second image sensor 111.

TG 114 generates signal CLK 1 required for an operation of first image sensor 110. In addition, TG 114 generates signal CLK2 required for an operation of second image sensor 111 in accordance with setting of controller 112. Examples of signals CLK 1 and CLK 2 include signals related to an operation of an electronic shutter, an operation of capturing a still image, an operation of capturing a moving image, and an operation of reading data. Details of these operations will be described later.

Controller 112 subjects the image data output from first image sensor 110 and second image sensor 111 to various image processings. More specifically, controller 112 may subject the output image data to a white balance adjusting process, a gamma correction process, a YC conversion process, a process of correcting rolling shutter distortions, an image synthesizing process, and an image compression process, for example. In addition, controller 112 controls TG 114 so as to adjust operation timings of first image sensor 110 and second image sensor 111. Moreover, controller 112 controls the whole of imaging apparatus 100 in accordance with computer programs described in software or firmware.

Memory 115 temporarily stores the image data output from first image sensor 110 and second image sensor 111. Memory 115 also temporarily stores image data that controller 112 is processing or has processed. Moreover, memory 115 functions as a memory for programs to be executed by controller 112 and may store commands for the programs, data, and a program chart for exposure control, for example. In short, memory 115 may temporarily store data used to perform the image processings in first image sensor 110 and second image sensor 111 and execute the programs.

Figure 2:
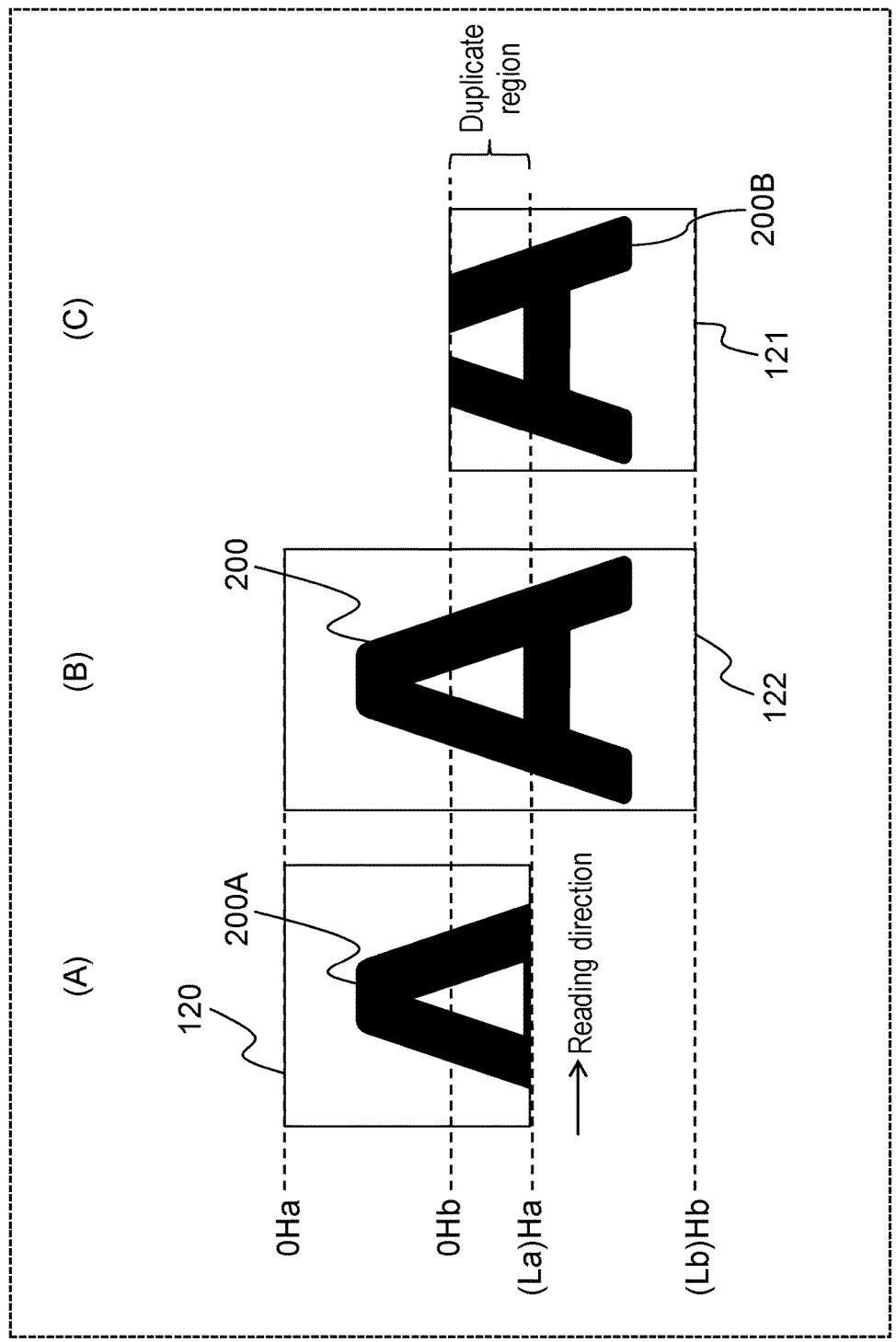
FIG. 2 is a schematic view of image data generated by a first image sensor and a second image sensor in the first exemplary embodiment.

FIG. 2 is a schematic view of exemplary images of subject 200 in a stationary state which are captured by first image sensor 110 and second image sensor 111. In these images, subject 200 is partly duplicated within respective duplicate regions. More specifically, Part (A) of FIG. 2 illustrates image data 120 on upper portion 200A of subject 200 which is captured by first image sensor 110. Part (C) of FIG. 2 illustrates image data 121 on lower portion 200B of subject 200 which is captured by second image sensor 111. Part (B) of FIG. 2 illustrates image data 122, which is generated by synthesizing image data 120 of subject 200 captured by first image sensor 110 and image data 121 of subject 200 captured by second image sensor 111.

First image sensor 110 reads captured image data 120 in a reading direction denoted by an arrow in FIG. 2. More specifically, first image sensor 110 sequentially reads individual lines composing image data 120 from start line 0Ha to end line (La)Ha. Likewise, second image sensor 111 reads captured image data 121 in the reading direction denoted by the arrow in FIG. 2. More specifically, second image sensor 111 sequentially reads individual lines composing image data 121 from start line 0Hb to end line (Lb)Hb. The optical systems in first image sensor 110 and second image sensor 111 are arranged in a direction vertical to the reading direction, so that subject 200 is partly duplicated in captured images. In FIG. 2, regions of image data 120, image data 121, and image data 122 between lines 0Hb and (La)Ha each correspond to the duplicate region.

The number ΔL of lines contained in each duplicate region may be calculated by comparing, pixel by pixel, image data on a test chart captured by first image sensor 110 and image data on the test chart captured by second image sensor 111, for example.

[1-2. Operation]

A description will be given below of an operation of imaging apparatus 100 configured above.

Figure 3:
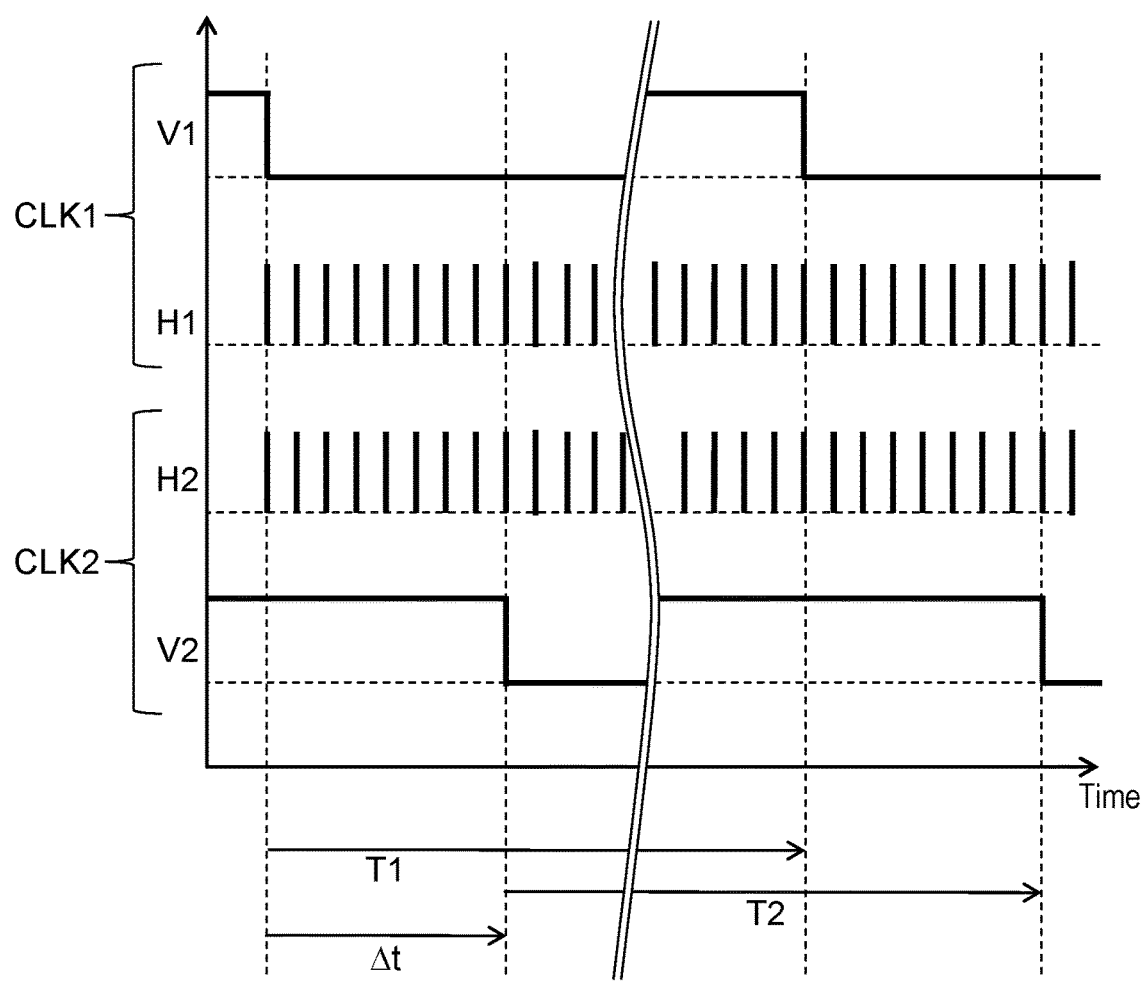
FIG. 3 is a timing chart of signals related to operations of the first image sensor and the second image sensor in the first exemplary embodiment.

FIG. 3 is a timing chart showing exemplary signals generated by TG 114 illustrated in FIG. 1. Horizontal synchronization signal H1 indicates a horizontal synchronization timing for first image sensor 110. Vertical synchronization signal V1 indicates a vertical synchronization timing for first image sensor 110. Vertical synchronization signal V1 has period T1. Horizontal synchronization signal H2 indicates a horizontal synchronization timing for second image sensor 111. Vertical synchronization signal V2 indicates a vertical synchronization timing for second image sensor 111. Vertical synchronization signal V2 has period T2. For example, horizontal synchronization signals H1 and H2 may be generated by multiplying and/or dividing a clock signal of a single oscillator. Thus, horizontal synchronization signals H1 and H2 are synchronized with each other. Vertical synchronization signal V1 may be generated by dividing operation clock C1 (not illustrated), for example. Vertical synchronization signal V2 may be generated by dividing operation clock C2 (not illustrated), for example. Operation clocks C1 and C2 are synchronized with each other. Vertical synchronization signal V2 is delayed from vertical synchronization signal V1 by time Δt according to setting of controller 112.

FIG. 4A and FIG. 4B are timing charts each indicating exposure timings for first image sensor 110 and second image sensor 111. Hereinafter, a description will be given regarding a case where first image sensor 110 and second image sensor 111 operate in an external trigger synchronization mode.

In FIG. 4A and FIG. 4B, start line 0Ha is the first one of the lines that first image sensor 110 images. Start line 0Ha extends from imaging start point PS1 to imaging end point PE1. End line (La)Ha is the last one of the lines that first image sensor 110 images. End line (La)Ha extends from imaging start point QS1 to imaging end point QE1.

A trigger for first image sensor 110 is set to a falling edge of an external trigger signal (vertical synchronization signal V1). First image sensor 110 finishes exposing start line 0Ha at imaging end point PE1 and then starts reading the image data on start line 0Ha. After having read the image data on start line 0Ha, first image sensor 110 resets electric charge accumulated in the pixels and then starts the next exposure. The interval (period T1) between the falling edges of the external trigger signal (vertical synchronization signal V1) corresponds to an exposure time for first image sensor 110. As indicated by the alternate long and short dash line arrow that extends from imaging end point PE1 of start line 0Ha to point QE1 of end line (La)Ha, first image sensor 110 sequentially and repeatedly outputs, or reads, image data D1 on the individual lines, including start line 0Ha to end line (La)Ha, then resets electric charge accumulated in the pixels, and starts the next exposure.

Period E1 is a time interval between an exposure start point (imaging start point PS1) and an exposure start point (imaging end point QS1). At the exposure start point (PS1), first image sensor 110 starts exposing the image of start line 0Ha; at the exposure start point (QS1), first image sensor 110 starts exposing the image of end line (La)Ha. Period R1 is a time over which first image sensor 110 reads the image data on each frame. In this exemplary embodiment, a time over which first image sensor 110 resets the electric charge in the pixels after having read the image of a single line is contained within the period R1. Period R1 and period E1 may be set to the same value.

Start line 0Hb is the first one of the lines that second image sensor 111 images. Start line 0Hb extends from imaging start point MS1 to imaging end point ME1. End line (Lb)Hb is the last one of the lines that second image sensor 111 images. End line (Lb)Hb extends from imaging start point NS1 to imaging end point NE1. A trigger for second image sensor 111 is set to a falling edge of an external trigger signal (vertical synchronization signal V2). Second image sensor 111 finishes exposing start line 0Hb at imaging end point ME1 and then starts reading the image data on start line 0Hb. After having read the image data on start line 0Hb, second image sensor 111 resets electric charge accumulated in the pixels and then starts the next exposure. The interval (period T2) between the falling edges of the external trigger signal (vertical synchronization signal V2) corresponds to an exposure time for second image sensor 111. As indicated by the alternate long and two short dashes line arrow that extends from imaging end point ME1 of start line 0Hb to point NE1 of end line (Lb)Hb, second image sensor 111 sequentially and repeatedly outputs, or reads, image data on the individual lines, including start line 0Hb to end lines (Lb)Hb, then resets electric charge accumulated in the pixels, and starts the next exposure.

Period E2 is a time interval between an exposure start point (imaging start point MS1) and an exposure start point (imaging start point NS1). At the exposure start point (MS1), second image sensor 111 starts exposing the image of start line (0Hb); at the exposure start point (NS1), second image sensor 111 starts exposing the image of end line (Lb)Hb. Period R2 is a time over which second image sensor 111 reads the image data on each frame. In this exemplary embodiment, a time over which second image sensor 111 resets the electric charge in the pixels after having read the image of a single line is contained within period R2. Period R2 and period E2 may be set to the same value.

In the external trigger synchronization mode, as described above, each of first image sensor 110 and second image sensor 111 uses an external signal (vertical synchronization signal) as a trigger signal and controls an exposure time (or a reading timing) for the images of the individual lines arranged horizontally.

FIG. 4A is a timing chart of exposure operations of first image sensor 110 and second image sensor 111 when first image sensor 110 and second image sensor 111 capture images of subject 201. In this case, the external trigger signal for first image sensor 110 (vertical synchronization signal V1) is synchronized with the external trigger signal for second image sensor 111 (vertical synchronization signal V2). Since both first image sensor 110 and second image sensor 111 employ a rolling shutter type, the exposure period for start line 0Ha (PS1 to PE1) and the exposure period for end line (La)Ha (QS1 to QE1) are set at different timings. For example, supposing subject 201 is moving relative to imaging apparatus 100 at a high speed and in the right direction of FIG. 4A, image data read by first image sensor 110 is like image data 202A. Since vertical synchronization signal V1 is synchronized with vertical synchronization signal V2, the exposure period (MS1 to ME1) over which second image sensor 111 exposes start line 0Hb coincides with the exposure period (PS1 to PE1) over which first image sensor 110 exposes start line 0Ha. Therefore, image data read by second image sensor 111 is like image data 203A.

Supposing a ΔL number of lines are present within each duplicate region, the first lines within the respective duplicate regions correspond to line (La−ΔL)Ha for first image sensor 110 and line 0Hb (MS1 to ME1) for second image sensor 111. The end lines within respective duplicate regions correspond to line (La)Ha (QS1 to QE1) for first image sensor 110 and line (ΔL)Hb for second image sensor 111. In this case, the exposure period over which first image sensor 110 exposes the lines within the duplicate region and the exposure period over which second image sensor 111 exposes the lines within the duplicate region are set at different timings.

In the example of FIG. 4A, as described above, when a subject is moving relative to imaging apparatus 100, the duplicate regions are exposed at different timings by first image sensor 110 and second image sensor 111. As a result, a time shift may occur between the duplicate region in the image data generated by first image sensor 110 and the duplicate region in image data generated by second image sensor 111.

FIG. 4B is a timing chart, in this exemplary embodiment, of exposure operations of first image sensor 110 and second image sensor 111 when first image sensor 110 and second image sensor 111 capture images of subject 201. In this example, an external trigger signal (vertical synchronization signal V2) for second image sensor 111 is delayed by time Δt from an external trigger signal (vertical synchronization signal V1) for first image sensor 110, unlike the example of FIG. 4A.

In the example of FIG. 4B, first image sensor 110 uses vertical synchronization signal V1 having period T1 as its trigger signal and reads the individual lines. After having read all the lines, imaging apparatus 100 starts the next exposure. The period T1 corresponds to an exposure period over which first image sensor 110 exposes each line. Second image sensor 111 uses vertical synchronization signal V2 having period T2 as its trigger signal and reads the individual lines. In this case, vertical synchronization signal V2 is delayed by time Δt from vertical synchronization signal V1. Specifically, after having read all the lines, imaging apparatus 100 resets electric charge accumulated in the pixels and then starts the next exposure. Suppose subject 201 is moving relative to imaging apparatus 100 at a high speed and in the right direction of FIG. 4B. Image data read by first image sensor 110 over the period indicated by the alternate long and short dash line arrow that extends from imaging end point PE1 of start line 0Ha to point QE1 of end line (La)Ha is like image data 202B, which is similar to image data 202A illustrated in FIG. 4A. As opposed to the example of FIG. 4A, however, the timing at which second image sensor 111 exposes start line 0Hb is delayed by time Δt from the timing at which first image sensor 110 exposes start line 0Ha. In this case, image data read by second image sensor 111 over the period indicated by the alternate long and two short dashes line arrow that extends from imaging end point ME1 of start line 0Hb to point NE1 of end line (Lb)Hb is like image data 203B.

Supposing a ΔL number of lines are present within each duplicate region, the first lines within the respective duplicate regions correspond to line (La−ΔL)Ha for first image sensor 110 and line 0Hb (MS1 to ME1) for second image sensor 111. The end lines within the respective duplicate regions correspond to line (La)Ha (QS1 to QE1) for first image sensor 110 and line (ΔL)Hb for second image sensor 111. In this case, the exposure period over which first image sensor 110 exposes the lines within the duplicate region coincides with the exposure period over which second image sensor 111 exposes the lines within the duplicate region.

The image data on the duplicate region generated by first image sensor 110 is identical to the image data generated by second image sensor 111. Therefore, for example, the controller 112 may read, from image data generated by first image sensor 110, image data (the shaded portion of the image data D1) on first line (PS1 to PE1) to end line (QS1-QE1) contained within the duplicate region. In turn, the controller 112 may read, from the image data generated by second image sensor 111, only image data (the shaded portion of the image data D2) on the lines following the last line within the duplicate region. As can be seen from FIG. 4B, it should be noted that the reading operation of first image sensor 110 collides (overlap) with the reading operation of second image sensor 111 in some time zones.

[1-3. Function and Effect]

As described above, imaging apparatus 100 in this exemplary embodiment includes first image sensor 110, second image sensor 111, TG 114, and controller 112. The first image sensor 110 captures an image of a subject to generate first image data, and the second image sensor 111 captures an image of the subject to generate second image data. Each of the first image data and the second image data has a duplicate region in which the subject is partly duplicated. The controller 112 controls TG 114 in such a way that a period over which first image sensor 110 exposes lines within the duplicate region in the first image data coincides with a period over which second image sensor 111 exposes lines within the duplicate region in the second image data.

Controlling TG 114 in the above manner can reduce a difference in timing between the period over which first image sensor 110 exposes lines within the duplicate region in the first image data and the period over which second image sensor 111 exposes lines within the duplicate region in the second image data. This results in a reduction in a time shift between boundary regions of the first image data generated by first image sensor 110 and the second image data generated by second image sensor 111.

In this exemplary embodiment, controller 112 may control timing generator (TG) 114, based on the number of lines ΔL within each duplicate region in such a way that a frame synchronization timing (V2) for second image sensor 111 is delayed from a frame synchronization timing (V1) for first image sensor 110.

Controlling timing generator (TG) 114 in the above manner can adjust both a timing of the period over which first image sensor 110 exposes lines in the first image data and a timing of the period over which second image sensor 111 exposes lines in the second image data, in accordance with a frame period. This results in a reduction of a load placed on controller 112.

In this exemplary embodiment, controller 112 preferably controls TG 114 in such a way that time Δt [sec] by which the exposure timing for second image sensor 111 is delayed from the exposure timing for first image sensor 110 satisfies condition (1) described below, $$\Delta t/E1 = 1 - \Delta L/L1 \quad (1)$$

where E1 denotes a period [sec] between a start time of an exposure of a start line imaged by first image sensor 110 and a start time of an exposure of an end line imaged by first image sensor 110;

L1 denotes the number of horizontal lines imaged by first image sensor 110; and

ΔL denotes the number of lines within the duplicate region which are imaged by first image sensor 110.

Controlling TG 114 in the above manner can adjust appropriately both a timing of a period over which first image sensor 110 exposes lines within the duplicate region in the first image data and a timing of a period over which second image sensor 111 exposes lines within the duplicate region in the second image data. This results in a reduction of a time shift between boundary regions of the first image data generated by first image sensor 110 and the second image data generated by second image sensor 111. Consequently, imaging apparatus 100 can subject resultant image data to image processing as if the image data were obtained from a single rolling shutter type image sensor, thereby correcting rolling shutter distortions of the image data.

In this exemplary embodiment, controller 112 may synthesize an image of a designated area in the first image data generated by first image sensor 110 and an image of a designated area in the second image data generated by second image sensor 111.

Synthesizing both images in the above manner enables imaging apparatus 100 to expand a captured video without having to change resolutions of image sensors.

In this exemplary embodiment, controller 112 partly cuts out the generated first image data and second image data.

For example, when imaging apparatus 100 is installed in a stadium, imaging apparatus 100 can generate a wide-angle video of a view inside the stadium and then cut out a video containing a subject of interest from this wide-angle video. Therefore, imaging apparatus 100 can provide a video viewed at any given angle, thus offering a wide selection of videos.

Second Exemplary Embodiment

A second exemplary embodiment will be described below with reference to FIG. 5. This second exemplary embodiment is a modification of the foregoing first exemplary embodiment.

[2-1. Configuration]

The configuration and duplicate regions of the second exemplary embodiment are substantially the same as in the first exemplary embodiment.

[2-2. Operation]

Figure 5:
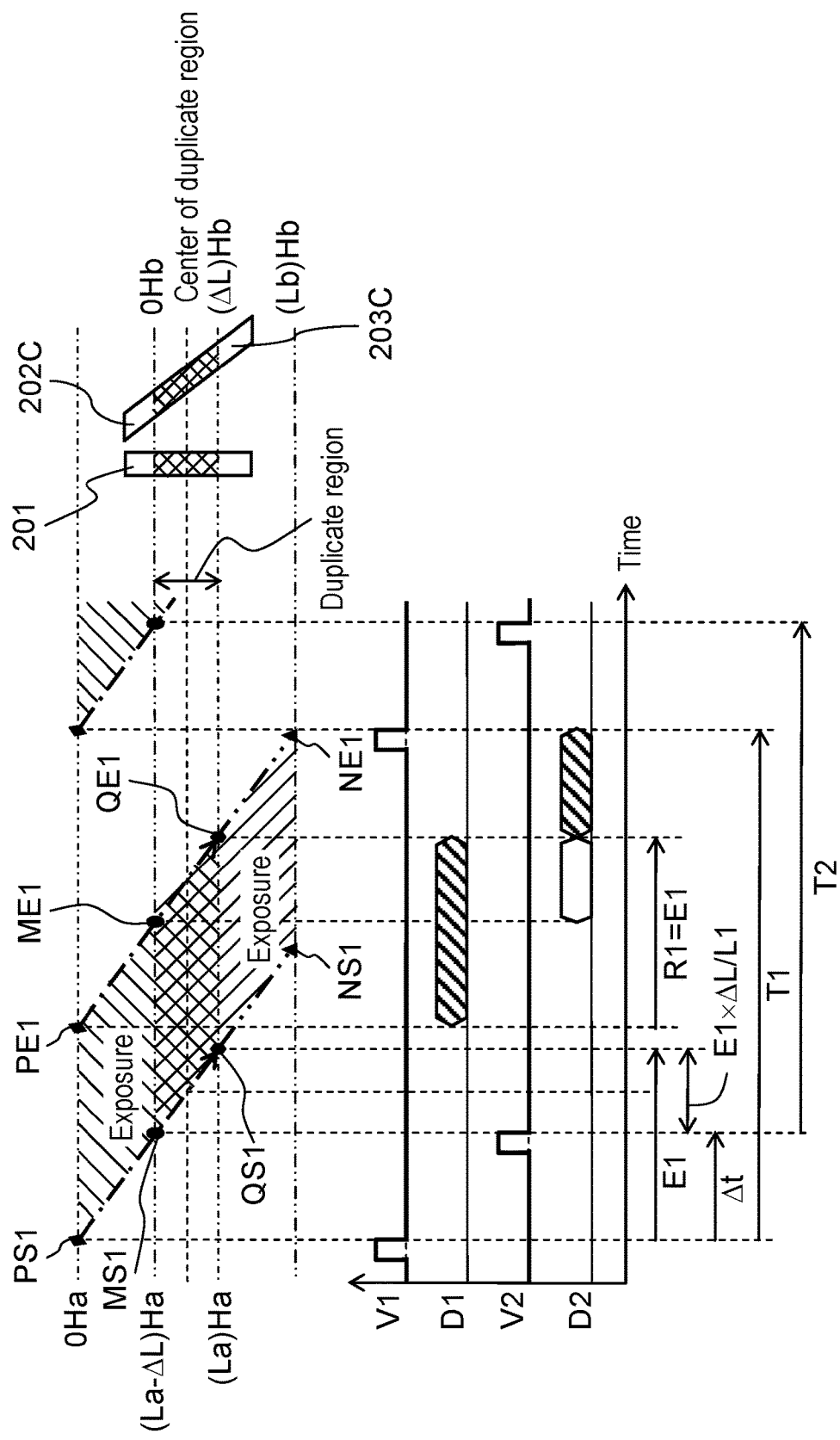
FIG. 5 is a timing chart, in a second exemplary embodiment of the present disclosure, of signals related to operations of a first image sensor and a second image sensor.

FIG. 5 is a timing chart of exposure operations of first image sensor 110 and second image sensor 111 when first image sensor 110 and second image sensor 111 capture images of subject 201. In this case, an external trigger signal (vertical synchronization signal V2) for second image sensor 111 is delayed by time Δt from an external trigger signal (vertical synchronization signal V1) for first image sensor 110.

First image sensor 110 uses vertical synchronization signal V1 having period T1 as its trigger signal and starts exposing the individual lines. The exposure time, which is a period between the time when first image sensor 110 starts exposing start line 0Ha and the time when first image sensor 110 starts reading the image of the start line 0Ha, is preset in first image sensor 110. Period T1 is a period between the time when the first image sensor 110 starts exposing the start line 0Ha (PS1 to PE1) and the time when second image sensor 111 finishes reading end line (NS1 to NE1). Period T1 corresponds to a frame period.

Period E1 is a period between exposure start point PS1 at which first image sensor 110 starts imaging start line 0Ha and exposure start point QS1 at which first image sensor 110 starts imaging end line (La)Ha. Period R1 is a period over which first image sensor 110 reads the image data on a single captured frame image. In this exemplary embodiment, period R1 and the period E1 may be set to the same value.

Second image sensor 111 uses, as its trigger signal, a falling edge of vertical synchronization signal V2 having period T2 which is delayed by time Δt from vertical synchronization signal V1, and starts exposing the individual lines. The exposure time, which is a period between the time when second image sensor 111 starts exposing start line 0Hb and the time when second image sensor 111 starts reading the image of the start line 0Hb, is preset in second image sensor 111. The exposure times for first image sensor 110 and second image sensor 111 may be set to the same value. For example, suppose subject 201 is moving relative to imaging apparatus 100 at a high speed and in the right direction of FIG. 5. The image data read by first image sensor 110 is like image data 202C, which is similar to image data 202B illustrated in FIG. 4B. The exposure timing at which second image sensor 111 starts exposing start line 0Hb (MS1 to ME1) is delayed by time Δt from the exposure timing at which first image sensor 110 starts exposing start line 0Ha (PS1 to PE1). Thus, the image data read by second image sensor 111 is like image data 203C.

Supposing a ΔL number of lines are present within each duplicate region, the first lines within the respective duplicate regions correspond to line (La−ΔL)Ha for first image sensor 110 and line 0Hb (MS1 to ME1) for second image sensor 111. Likewise, the end lines within the respective duplicate regions correspond to line (La)Ha (QS1 to QE1) for first image sensor 110 and line (ΔL)Hb for second image sensor 111. Consequently, the exposure period over which first image sensor 110 exposes the individual lines within the duplicate region coincides with the exposure period over which second image sensor 111 exposes the lines within the duplicate region.

The image data within the duplicate region for first image sensor 110 is identical to the image data within the duplicate region for second image sensor 111. Therefore, for example, for each frame, the controller 112 may read, from the image data generated by first image sensor 110, the image data (the shaded portion of the image data D1) on the first lines (PS1 to PE1) to end line (La)Ha (QS1 to QE1) contained within the duplicate region. Subsequently, the controller 112 may read, from the image data generated by second image sensor 111, image data (the shaded portion of the image data D2) on the lines following the last line within the duplicate region.

[2-3. Function and Effect]

As can be seen from FIG. 5, it should be noted that the reading operation of first image sensor 110 does not collide (overlap) with the reading operation of second image sensor 111. This leads to a narrower bandwidth of memory 115, thus achieving a highly flexible design.

Third Exemplary Embodiment

A third exemplary embodiment will be described below with reference to FIG. 6 and FIG. 7.

[3-1. Configuration]

A description will be given of an outline of a configuration of imaging apparatus 600 in the third exemplary embodiment.

Figure 6:
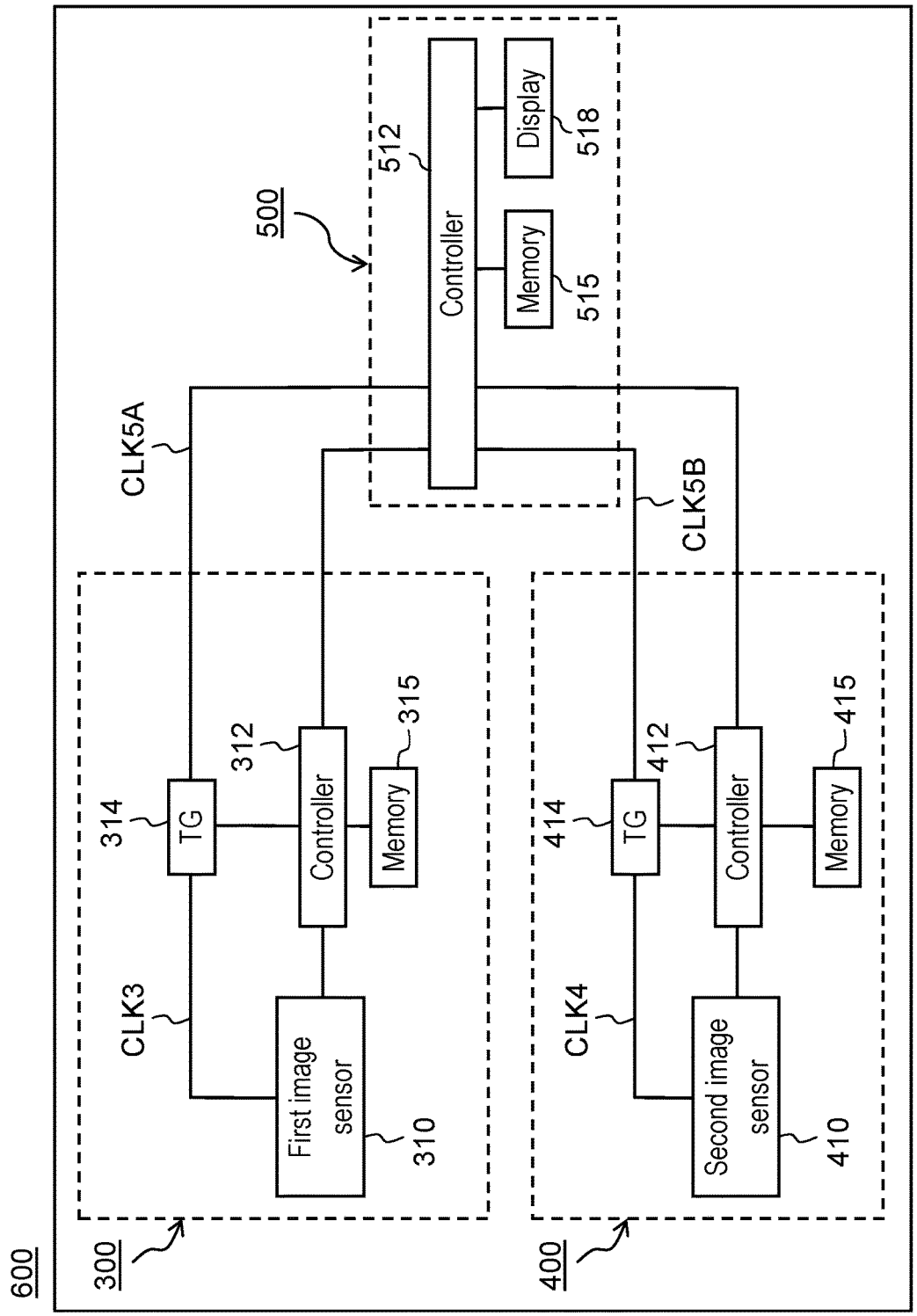
FIG. 6 is a block diagram illustrating an imaging apparatus in a third exemplary embodiment of the present disclosure.

FIG. 6 is a block diagram illustrating a configuration of imaging apparatus 600.

Imaging apparatus 600 includes first image pickup section 300, second image pickup section 400, and external device 500.

First image pickup section 300 includes first image sensor 310, timing generator (TG) 314, controller 312, and memory 315. Controller 312 outputs image data generated by first image sensor 310 to external device 500 via an external connection.

Second image pickup section 400 has substantially the same configuration as in first image pickup section 300. Second image pickup section 400 includes second image sensor 410, timing generator (TG) 414, controller 412, and memory 415. Controller 412 outputs image data generated by second image sensor 410 to external device 500 via an external connection.

External device 500 includes controller 512, memory 515, and display 518.

Each of first image sensor 310 and second image sensor 410, which may typically be a CMOS sensor, captures an image of a subject to generate image data. For example, the generated image data may have 3840 pixels in a horizontal direction and 2160 pixels in vertical direction, namely, have a 4K resolution and may contain frame images to be captured at a frame rate of 60 fps. The image of the subject is created by an optical system (not illustrated) in each of first image sensor 110 and second image sensor 111.

TG 314 generates signal CLK3 required for an operation of first image sensor 310. In response to the reception of external signal CLK5A from controller 512, TG 314 switches from signal CLK3 to external signal CLK5A via a phase locked loop (PLL), for example. TG 414 generates signal CLK4 required for an operation of second image sensor 410. In response to the reception of external signal CLK5B from controller 512, TG 414 switches from signal CLK4 to external signal CLK5B via a PLL, for example. A description will be given later regarding processes of switching between signal CLK3 and external signal CLK5A and between CLK4 signal and external signal CLK5B.

Controller 512 subjects the image data output from first image sensor 310 and second image sensor 410 to various image processings. More specifically, controller 512 may subject the output image data to a white balance adjusting process, a gamma correction process, a YC conversion process, a process of correcting rolling shutter distortions, an image synthesizing process, an image segmentation process, and an image compression process, for example. In addition, controller 512 controls TG 314 and TG 414, thereby adjusting timings of operations of first image sensor 310 and second image sensor 410. Controller 512 controls the whole of imaging apparatus 600 in accordance with computer programs described in software or firmware.

Memory 315 temporarily stores the image data output from first image sensor 310. Memory 315 also temporarily stores image data that controller 312 is processing or has processed. Moreover, memory 315 functions as a memory for programs to be executed by controller 312 and may store commands for the programs, data, and a program chart for exposure control, for example. In short, memory 315 may temporarily store data used to perform the image processings and execute the programs in first image sensor 310.

Memory 415 temporarily stores the image data output from second image sensor 410. Memory 415 also temporarily stores image data that controller 412 is processing or has processed. Moreover, memory 415 functions as a memory for programs to be executed by controller 412 and may store commands for the programs, data, and a program chart for exposure control, for example. In short, memory 415 may temporarily store data used to perform the image processings and execute the programs in second image sensor 410.

Memory 515 temporarily stores the image data output from first image sensor 310 and second image sensor 410. Memory 515 also temporarily stores image data that controller 512 is processing or has processed. Moreover, memory 515 functions as a memory for programs to be executed by controller 512 and may store commands for the programs, data, and a program chart for exposure control, for example. In short, memory 515 may temporarily store data used to perform the image processings and execute the programs in first image sensor 310 and second image sensor 410.

Display 518, which may be implemented using a liquid crystal display, displays image data that controller 512 has subjected to image processing. More specifically, display 518 displays image data obtained by synthesizing the image data from first image sensor 310 and the image data from second image sensor 410, image data obtained by partly cutting out the image data from first image sensor 310 and the image data from second image sensor 410, or an operation panel, for example.

Similar to the foregoing first exemplary embodiment, the optical systems in first image pickup section 300 and second image pickup section 400 are arranged in a direction vertical to the reading direction, so that the images of a subject are partly duplicated within duplicate regions in each of which a ΔL number of lines are arranged.

[3-2. Operation]

Figure 7:
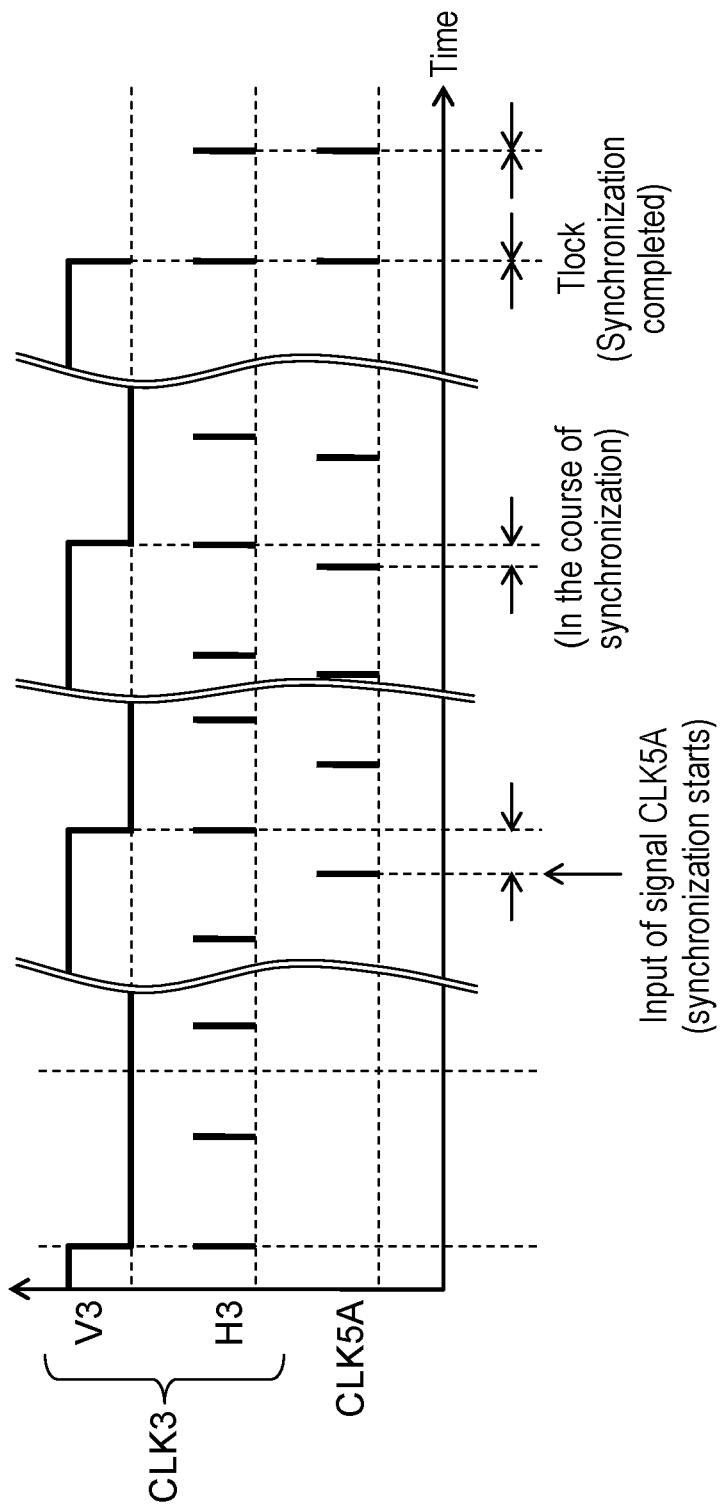
FIG. 7 is a timing chart, in the third exemplary embodiment, of signals related to operations of a first image sensor and a second image sensor.

FIG. 7 is a timing chart showing exemplary signals related to an operation of first image sensor 310 in the third exemplary embodiment. Horizontal synchronization signal H3 indicates a horizontal synchronization timing for first image sensor 310. Vertical synchronization signal V3 indicates a vertical synchronization timing for first image sensor 310. First image pickup section 300 operates with signal CLK3 generated by TG 314 until first image pickup section 300 receives external signal CLK5A from external device 500. Once a horizontal synchronization timing signal enters first image pickup section 300, for example, as external signal CLK5A, TG 314 receives, via the PLL, a feedback about a difference in phase between horizontal synchronization signal H3 and external signal CLK5A, so that horizontal synchronization signal H3 eventually becomes synchronized with external signal CLK5A (at time Tlock in FIG. 7). Likewise, once external signal CLK5B enters second image pickup section 400, horizontal synchronization signal H3 becomes synchronized with external signal CLK5B in second image pickup section 400.

Controller 512 delays, by time Δt according to the number ΔL of duplicated lines, a vertical synchronization timing for second image sensor 410 from vertical synchronization signal V3 (frame synchronization timing) for first image sensor 310. Time Δt may be set in substantially the same manner as in foregoing first and second exemplary embodiments.

[3-3. Function and Effect]

As described above, even when a plurality of imaging apparatus each of which has a single image sensor are combined together, it is possible to provide a wide-angle image from videos generated by the respective image sensors with a minimal time shift, similar to forgoing first and second exemplary embodiments.

Other Embodiments

Up to this point, the first to third exemplary embodiments, which are examples of the technology disclosed in this application, have been described. However, application of the technology of the present disclosure is not limited to the first to third exemplary embodiments and may be applicable to exemplary embodiments that undergo modifications, substitutions, additions, and omissions, for example.

Some other exemplary embodiments will be described below.

In the foregoing first to third exemplary embodiments, CMOS image sensors (110, 111, 310, 410) are used as exemplary image sensors. In the present disclosure, however, any rolling shutter type image sensors may be used. In other words, the image sensors are not limited to CMOS image sensors. Furthermore, the image data regarding all the pixels of the image sensors are recorded in the first to third exemplary embodiments. However, some of the pixels of the image sensors may be used as effective pixels, and only image data regarding the effective pixels may be recorded. In this case, the number ΔL of lines within each duplicate region may be calculated using the non-effective pixels.

In the foregoing first to third exemplary embodiments, controller (112, 312, 412, 512) is used as an exemplary controller that controls imaging apparatus (100, 600) and first and second image pickup sections (300, 400). In the present disclosure, controller (112, 312, 412, 512) may be implemented using hardware logic or a microcomputer in which programs are stored. Implementing the controller (112, 312, 412, 512) using hardware logic could achieve high-speed processing. Implementing the controller (112, 312, 412, 512) using a microcomputer could achieve a highly flexible design of the controller, because it is possible to modify control processing by changing the programs. Examples of image processings to be performed by controller (112, 312, 412, 512) include a white balance adjusting process, a gamma correction process, a scratch correction process, an aberration correction process, a YC conversion process, and a process of correcting rolling shutter distortions. However, the image processings are not limited to these examples. In addition, the controller does not necessarily have to perform all of these image processings and may perform only a portion of the image processings. Furthermore, the image processings may be performed by an image processor disposed outside controller (112, 312, 412, 512), and this image processor may be incorporated into an image sensor in a module.

In the foregoing first to third exemplary embodiments, image sensors (110, 111, 310, 410) use a falling edge of a trigger signal as their triggers. However, their triggers are not limited to a falling edge of a trigger signal. Alternatively, image sensors (110, 111, 310, 410) use a rising edge of a trigger signal as their triggers. Furthermore, the number of lines to be read by first image sensor 110 is equal to the number of lines to be read by second image sensor 111, and the number of lines to be read by first image sensor 310 is equal to the number of lines to be read by second image sensor 410; however, these configurations are not limiting. Alternatively, a larger number of lines may be read by first image sensor (110 or 310), or a larger number of lines may be read by second image sensor (111 or 410).

In the foregoing first to third exemplary embodiments, the exposure periods for image sensors (110, 111, 310, 410) are controlled using the interval between edges of an external trigger signal. However, how to control the exposure periods is not limiting. Alternatively, exposure periods (read timings) may be preset in image sensors (110, 111, 310, 410). In short, the exposure periods (read timings) may be controlled in accordance with specifications of image sensors to be used.

In the foregoing first to third exemplary embodiments, an external trigger synchronization mode is exemplified, in which the vertical synchronization signals are used as triggers for controlling timings at which image sensors (110, 111, 310, 410) start exposing each line. As an alternative example, however, the horizontal synchronization signals may be used as triggers for controlling timings at which image sensors (110, 111, 310, 410) start exposing each line in order to control the exposure periods. In short, the exposure period (read timing) for each line to be imaged by image sensors may be controlled in accordance with specifications of the image sensors to be used.

In the foregoing first to third exemplary embodiments, the reading timings for first image sensor (110, 310) and second image sensor (111, 410) conform to the timing charts of FIG. 4B and FIG. 5. As illustrated in FIG. 4B and FIG. 5, the reading timing for second image sensor 111 may be delayed by time Δt from the reading timing for first image sensor 110. However, if the reading direction of first image sensor 110 is opposite to the reading direction of second image sensor 111, the reading timing for first image sensor 110 may be delayed by time Δt from the reading timing for second image sensor 111.

In the foregoing first to third exemplary embodiments, TG (114, 314, 414) is disposed outside controller (112, 512);

however, TG (114, 314, 414) may be disposed inside controller (112, 512) or image sensors (110, 111, 310, 410). In short, TG (114, 314, 414) may be disposed at any location where it is possible to control the exposure period (reading timing) for each line to be imaged by image sensors (110, 111, 310, 410).

In the foregoing first and second exemplary embodiments, the video of the image data generated by first image sensor 110 is used as the image data on the lines within the duplicate regions. As an alternative example, however, the video of the image data generated by second image sensor 111 may be used as the image data on the lines within the duplicate regions. Video created by subjecting the image data generated by first image sensor 110 and the image data generated by second image sensor 111 to image processing may be used as the image data on the lines within the duplicate regions.

In the foregoing first to third exemplary embodiments, the synchronization of signals related to the operations of image sensors (110, 111, 310, 410) conforms to the timing charts of FIG. 3 and FIG. 7. In the examples of FIG. 3 and FIG. 7, first image sensor (110, 310) and second image sensor (111, 410) are synchronized with the horizontal synchronization signal. As an alternative example, however, first image sensor (110, 310) and second image sensor (111, 410) may be synchronized with their operation clock signals or the vertical synchronization signal. In short, any clock signal may be used as a reference signal for image sensors.

In the foregoing third exemplary embodiment, display 518 is a liquid crystal display. In the present disclosure, however, display 518 is not limited to a liquid crystal display. Alternatively, display 518 may be an organic electro-luminescence (EL) display or an external monitor connected to external device 500.

The foregoing exemplary embodiments are examples of the technology in the present disclosure and therefore may undergo various modifications, substitutions, additions and omissions, for example, within the scope of the claims and their equivalents. The present disclosure is applicable to imaging apparatus that create a wide-angle video by synthesizing a plurality of videos and cut out an intended area from the wide-angle video. Concrete examples of such imaging apparatus include a digital camera, a digital video camera, a surveillance camera, a mobile phone with camera function, and a smartphone.

What is claimed is:

1. An imaging apparatus comprising:
   a first image sensor of a rolling shutter type which captures an image of a subject to generate first image data;
   a second image sensor of a rolling shutter type which captures an image of the subject to generate second image data, each of the first image data and the second image data having a duplicate region in which the subject is partly duplicated;
   a timing generator that controls operation timings of the first image sensor and the second image sensor; and
   a controller that subjects the generated first image data and the generated second image data to image processing and that controls the timing generator,
   the controller controlling the timing generator in such a way that a period over which the first image sensor exposes lines within the duplicate region in the first image data coincides with a period over which the second image sensor exposes lines within the duplicate region in the second image data,
   wherein the controller controls the timing generator in such a way that a time $\Delta t$ by which a frame synchronization timing of the second image sensor is delayed from a frame synchronization timing of the first image sensor satisfies condition (1) described below, $$\Delta t/E1 = 1 - \Delta L/L1 \quad (1)$$

where E1 denotes a period [sec] between a start time of an exposure of a start line imaged by the first image sensor and a start time of an exposure of an end line imaged by the first image sensor,
   L1 denotes a number of horizontal lines imaged by the first image sensor, and
   $\Delta L$ denotes a number of lines within the duplicate region which are imaged by the first image sensor.

2. The imaging apparatus according to claim 1, wherein
   the controller controls the timing generator, based on a number of lines within each duplicate region in such a way that a frame synchronization timing for the second image sensor is delayed from a frame synchronization timing for the first image sensor.

3. The imaging apparatus according to claim 1, wherein
   the controller synthesizes an image within a designated area in the first image data generated by the first image sensor and an image within a designated area in the second image data generated by the second image sensor.

4. The imaging apparatus according to claim 1, wherein
   the controller cuts out an image of a designated area from the first image data generated by the first image sensor and the second image data generated by the second image sensor.

* * * * *